W. P. MALLETT.
SLED RUNNER FOR BABY CARRIAGES.
APPLICATION FILED JUNE 2, 1917.
1,264,110.
Patented Apr. 23, 1918.
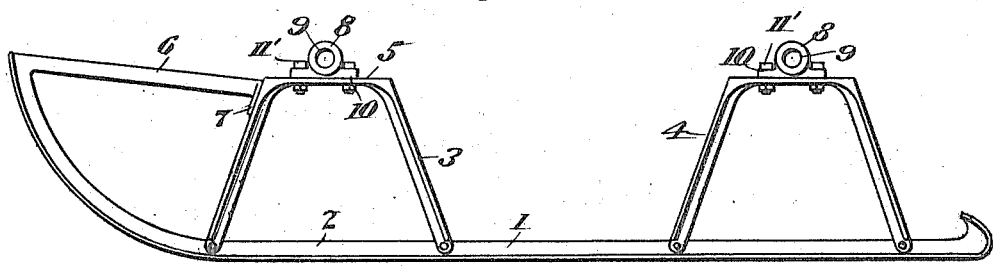
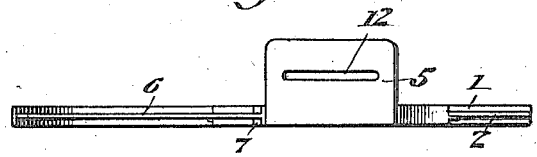
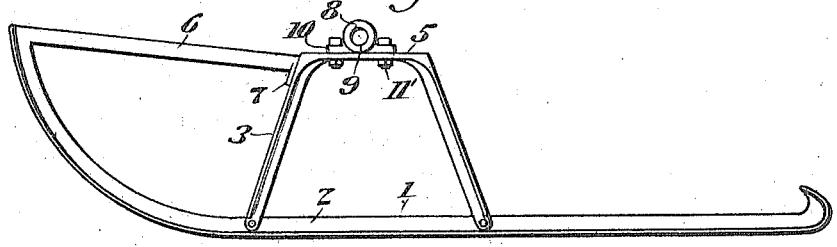
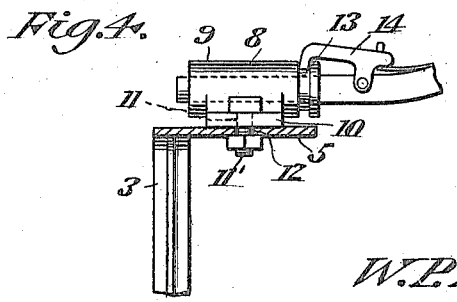
WITNESSES
INVENTOR
W. P. Mallett
BY Victor J. Evans
ATTORNEY

UNITED STATES PATENT OFFICE.

WALTER P. MALLETT, OF RENSSELAER, NEW YORK.

SLED-RUNNER FOR BABY-CARRIAGES.

1,264,110.  Specification of Letters Patent.  Patented Apr. 23, 1918.

Application filed June 2, 1917. Serial No. 172,453.

*To all whom it may concern:*

Be it known that I, WALTER P. MALLETT, a citizen of the United States, residing at Rensselaer, in the county of Rensselaer and State of New York, have invented new and useful Improvements in Sled-Runners for Baby-Carriages, of which the following is a specification.

This invention relates to improvements in detachable sleigh-runners for baby carriages and go-carts.

In carrying out this invention, I have it in mind to provide a more efficient means for adjusting the sleigh-runner to vehicles of different sizes, and to provide a structure whereby the runner is rendered more efficient and lighter in weight and the cost of production is decreased.

I further propose to render the runner attachable to vehicles wherein a catch is provided on the axle for engaging a groove wherewith the hub of the wheel is formed to retain the wheel in position.

With these and other objects in view, the invention resides in the construction, combination, and arrangement of parts described in the specification below, more particularly set forth in the appended claims and delineated in the drawings, in which—

Figure 1 is a side elevation of the runner.

Fig. 2 is a fragmentary top plan view showing the attaching device removed from the runner-element.

Fig. 3 represents a form suited to two wheeled vehicles.

Fig. 4 illustrates details of the invention.

Referring to the drawings more particularly, the runner comprises an elongated shoe 1 for sliding movement on snow-covered ground or ice, and formed at either end with an upward curvature to facilitate riding over obstacles. The shoe is constructed of T-section metal having the web 2 disposed upwardly; and, riveted to the web, toward each end of the runner, are upstanding frame members 3 and 4 respectively, each substantially in the form of an inverted U, but having the limbs divergently disposed, and the portion 5 connecting the limbs flattened to extend in parallelism with the shoe 1.

Extending between the forward frame member 3, and the upturned extremity of the shoe 1 is a brace-rod 6 preferably constituting an integral part of the shoe and having adjacent the frame member a downwardly bent lug 7 for riveted or other suitable connection thereto.

For securing the runner to the vehicle, sockets 8 are provided; each formed transversely with a bore 9 for reception of the axle, and further formed with lugs 10 constituting a flat surface adapted to coincide with the upper surface 5 of the frame member, and having openings 11 in the lugs 10 for passage of securing bolts 11′ extending downwardly through a slot 12, formed longitudinally of the portion 5 of the frame member, whereby the socket may be clampingly engaged with the frame member, and is adjustable longitudinally thereof. The socket 8 may be retained upon the axle by a nut, as commonly practised, or I may form the socket with a peripheral groove 13 adapted to be engaged by a spring catch member 14 on the axle.

By the above arrangement, it will be seen that the sockets may be conveniently adjusted toward and away from each other in accordance with the distance between the axles of the particular vehicle; and, when desired, I may construct the rear frame member 4 of greater height than the forward frame member 3, whereby the runner is adapted to vehicles having small wheels in front.

In the modification shown in Fig. 3, the rear frame member is dispensed with, this form of my invention being intended more particularly for application to two wheeled vehicles.

While I have here shown and described a preferred form of my invention for purposes of illustration, such embodiment is not to be interpreted as in any way limiting the spirit of the invention, as I reserve the right to variation and modification within the scope of the accompanying claim.

I claim:

In a detachable sled runner for baby-carriages having upwardly extending supporting members thereon, the combination of an inwardly projecting extension on the top of each member having its upper surface flat and provided with a slot, a socket member having a flat under surface engaging with the flat surface of the extension, side lugs on said member, and bolts passing through the said lugs and the slot.

In testimony whereof I affix my signature.

WALTER P. MALLETT.